United States Patent
Cao

(10) Patent No.: US 9,641,277 B2
(45) Date of Patent: May 2, 2017

(54) OPTICAL SIGNAL TRANSMISSION METHOD, APPARATUS AND SYSTEM

(71) Applicant: Huawei Technologies Co., Ltd., Shenzhen, Guangdong (CN)

(72) Inventor: Shiyi Cao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 373 days.

(21) Appl. No.: 14/284,173

(22) Filed: May 21, 2014

(65) Prior Publication Data
US 2014/0255035 A1    Sep. 11, 2014

Related U.S. Application Data

(63) Continuation of application No. PCT/CN2011/082515, filed on Nov. 21, 2011.

(51) Int. Cl.
*H04J 14/02* (2006.01)
*H04B 10/572* (2013.01)
*H04B 10/69* (2013.01)

(52) U.S. Cl.
CPC ........ *H04J 14/0278* (2013.01); *H04B 10/572* (2013.01); *H04B 10/69* (2013.01);
(Continued)

(58) Field of Classification Search
CPC .... H04J 14/02; H04J 14/0227; H04J 14/0202; H04J 14/0201; H04J 14/0278;
(Continued)

(56) References Cited

U.S. PATENT DOCUMENTS

| | | |
|---|---|---|
| 5,589,970 A | 12/1996 | Lyu et al. |
| 2003/0099243 A1 | 5/2003 | Oh et al. |

(Continued)

FOREIGN PATENT DOCUMENTS

| | | |
|---|---|---|
| CN | 1383277 A | 12/2002 |
| CN | 101110643 A | 1/2008 |

(Continued)

OTHER PUBLICATIONS

Pete Anslow, "Coding for the flexible grid in G.697", Ciena Corporation, Jun. 7-10, 2011, 3 pages.
(Continued)

*Primary Examiner* — Hanh Phan

(57) ABSTRACT

An optical signal transmission method includes: obtaining a signal identifier of data to be sent; obtaining corresponding optical frequency slot distribution information according to the signal identifier; and determining a corresponding carrier according to the obtained optical frequency slot distribution information, using the determined carrier to carry the data to be sent to generate an optical signal, and sending the generated optical signal. The optical signal transmission method provided in the present invention does not fix the optical frequency slot distribution into a wavelength identifier, the number of optical frequency slots is not limited by the wavelength identifier field length, and the data to be sent can be transmitted in an optical network by being carried on the carrier determined according to multiple optical frequency slots.

15 Claims, 4 Drawing Sheets

(52) U.S. Cl.
CPC .......... *H04J 14/02* (2013.01); *H04J 14/0202* (2013.01); *H04J 14/0258* (2013.01)

(58) Field of Classification Search
CPC ............... H04J 14/021; H04Q 11/0003; H04Q 11/0005; H04B 10/50; H04B 10/516; H04B 10/60
USPC .. 398/79, 83, 45, 48, 49, 50, 158, 159, 183, 398/202, 58, 56, 57; 370/225, 228, 252, 370/395.2, 395.21
See application file for complete search history.

(56) References Cited

U.S. PATENT DOCUMENTS

| | | |
|---|---|---|
| 2004/0252996 A1 | 12/2004 | McNicol |
| 2008/0170856 A1* | 7/2008 | Shi .................... H04J 14/0227 398/50 |
| 2013/0308945 A1* | 11/2013 | Dhillon .............. H04Q 11/0003 398/48 |
| 2014/0205297 A1 | 7/2014 | Cao |

FOREIGN PATENT DOCUMENTS

| | | |
|---|---|---|
| CN | 101764665 A | 6/2010 |
| JP | 2009171077 A | 7/2009 |
| JP | 2011139260 A | 7/2011 |
| WO | WO 2012/149780 A1 | 11/2012 |

OTHER PUBLICATIONS

M. Jinno, et al., "Management and Control Aspects of Spectrum Sliced Elastic Optical Path Network (Slice)", Sep. 19, 2010, 22 pages.

"Series G: Transmission Systems and Media, Digital Systems and Networks, Transmission media characteristics—Characteristics of optical components and subsystems; Spectral grids for WDM applications: DWDM frequency grid", ITU-T Recommendation G.694.1, Jun. 2002, 11 pages.

"Series G: Transmission Systems and Media, Digital Systems and Networks, Transmission media and optical systems characteristics—Characteristics of optical systems; Optical monitoring for dense wavelength division multiplexing systems", ITU-T Recommendation G.697, Nov. 2009, 36 pages.

Yu Song, et al., "A tunable wavelength routing scheme based on the sum and difference-frequency generation with double pass configuration and its applications", ACTA Physica Sinica, vol. 57, No. 2, Feb. 2008, 8 pages.

* cited by examiner

OPTICAL SIGNAL TRANSMISSION METHOD, APPARATUS AND SYSTEM

CROSS-REFERENCE TO RELATED APPLICATIONS

This application is a continuation of International Application No. PCT/CN2011/082515, filed on Nov. 21, 2011, which is hereby incorporated by reference in its entirety.

TECHNICAL FIELD

Embodiments of the present invention relate to the communications field, and in particular, to an optical signal transmission method, apparatus and system.

BACKGROUND

With rapid growth of traffic, bit rates of optical signals transmitted in a wavelength division multiplexing (WDM, Wavelength Division Multiplexing) network are higher and higher. In the near future, the bit rates of transmitted optical signals will be up to 400 Gbit/s ($4 \times 10^{11}$ bit/s) or even 1 Tbit/s ($1 \times 10^{12}$ bit/s). An optical network that uses a spectrum grid of a fixed width to transmit optical signals is called a fixed bandwidth optical network, and an optical network that uses spectrum grids of different widths to transmit optical signals is called a variable-bandwidth optical network. In this way, in a variable-bandwidth optical network, when the spectrum width of an optical signal is large, the spectrum of an optical signal may occupy multiple optical frequency slots (OFS, Optical Frequency Slot). In the present invention, an OFS refers to a spectrum resource of a minimum spectrum width in the optical network as far as a spectrum can be divided, that is, a minimum spectrum unit in the optical network as far as the spectrum can be divided.

An optical signal may be carried in a continuous spectrum region, or may be carried in separated spectrum regions. That is, an optical signal may occupy several continuously concatenated OFSs or occupy several separated OFSs.

In the prior art, management or control for transmission of optical signals is implemented by using a 32-bit wavelength identifier (Wavelength ID). A format of the wavelength identifier is given in Table 1:

| Wavelength ID (32 bits) | | | | |
|---|---|---|---|---|
| 0 1 2 | 3 4 5 6 | 7 8 9 10 11 12 13 14 15 16 17 18 19 20 21 22 23 24 25 | 26 27 28 29 30 31 |
| Grid (3 bits) | Channel spacing (4 bits) | n (16 bits) | Reserved |

In the foregoing table, the field Grid indicates whether the grid is a dense wavelength division multiplexing (DWDM, Dense Wavelength Division Multiplexing) grid or a coarse wavelength division multiplexing (CWDM, Coarse Wavelength Division Multiplexing) grid; the field Channel spacing indicates the type of a selected spectrum grid, for example, 100 GHz spacing, 50 GHz spacing, 25 GHz spacing, and so on; and the field n is used to calculate a nominal central frequency of an optical signal, that is, the field n indicates the nominal central frequency of the optical signal. The field Reserved is a reserved field.

However, the management or control for transmission of optical signals does not consider the application of a variable-bandwidth network, that is, does not consider a case where an optical signal may occupy multiple OFSs, and cannot identify spectrum information of the optical signals that have such characteristics. In the prior art, there is another method for controlling and managing transmission of optical signals. Considering that an optical signal may occupy multiple OFSs, the method defines the wavelength identifier as follows:

1) The definitions of the field Grid and the channel spacing field are basically unchanged.

2) The field n is modified to a field that indicates a nominal central frequency corresponding to a lowest-frequency OFS occupied by a signal but no longer indicates the nominal central frequency of the entire signal.

3) The first three bits of the field Reserved are modified to "extra-slots" to support the number of OFSs occupied by the signal, and the remaining 6 bits are still reserved.

The inventor of the present invention finds that in the prior art, the field n defines the lowest-frequency OFS occupied by the signal, and the field Reserved is used to define the number of OFSs occupied by the signal. However, according to this method, the optical signal can occupy only 8 OFSs, and the case where the optical signal occupies more OFSs cannot be described accurately. In extreme cases, assuming that one signal can select the OFS (using 6.25 GHz as a unit) at a C band arbitrarily, at most about 640 OFSs can be selected. In the case where an optical signal can occupy only several continuously concatenated OFSs, 10 bits are required, which is not supportable in the prior art. In addition, in a case where an optical signal can occupy several separated OFSs, the OFSs occupied by a signal need to be described completely, and 640 bits that amount to 80 bytes are required (using 6.25 GHz as a unit), which is excessive and far beyond the scope that can be described by the field Reserved. Such a manner of expressing the OFSs occupied by the signal is excessively cumbersome, and the management and control overhead is excessively large. In addition, in the prior art, the case that an optical signal is transmitted over different fibers cannot be handled.

SUMMARY

Embodiments of the present invention provide an optical signal transmission method, which can prevent an optical signal spectrum from being limited by a wavelength identifier byte length, so that data to be sent can be transmitted in an optical network by being carried on a carrier determined according to multiple optical frequency slots.

An optical signal transmission method includes:

obtaining a signal identifier of data to be sent;

obtaining corresponding optical frequency slot OFS distribution information according to the signal identifier; and determining a corresponding carrier according to the obtained optical frequency slot distribution information, using the determined carrier to carry the data to be sent to generate an optical signal, and sending the generated optical signal.

An optical signal transmission method includes:

obtaining a signal identifier of data to be transmitted;

obtaining receiver-side OFS distribution information and sender-side OFS distribution information according to the signal identifier;

determining a corresponding receiving carrier according to the obtained receiver-side OFS distribution information, and receiving, on the determined receiving carrier, an optical signal that carries the data to be transmitted; and determining a corresponding sending carrier according to the obtained sender-side OFS distribution information, and handing the received optical signal over to the determined sending carrier for sending.

An optical signal transmission method includes:

obtaining a signal identifier of data to be received;

obtaining corresponding optical frequency slot OFS distribution information according to the signal identifier; and determining a corresponding receiving carrier according to the obtained optical frequency slot distribution information, and receiving, on the determined receiving carrier, an optical signal that carries the data to be received.

An optical transmitter includes:

a first obtaining unit, configured to obtain a signal identifier of data to be sent, where the first obtaining unit is further configured to obtain corresponding optical frequency slot OFS distribution information according to the signal identifier;

an optical signal generating unit, configured to determine a corresponding carrier according to the optical frequency slot distribution information obtained by the first obtaining unit, and use the determined carrier to carry the data to be sent to generate an optical signal; and a first optical signal sending unit, configured to send the optical signal generated by the optical signal generating unit.

An optical add/drop multiplexer includes:

a second obtaining unit, configured to obtain a signal identifier of data to be transmitted, where the second obtaining unit is further configured to obtain receiver-side OFS distribution information and sender-side OFS distribution information according to the obtained signal identifier;

a first optical signal receiving unit, configured to determine a corresponding receiving carrier according to the receiver-side OFS distribution information obtained by the second obtaining unit, and receive, on the determined receiving carrier, an optical signal that carries the data to be transmitted;

an optical signal handover unit, configured to determine a corresponding sending carrier according to the sender-side OFS distribution information obtained by the second obtaining unit, and hand the optical signal received by the first optical signal receiving unit over to the determined sending carrier; and a second optical signal sending unit, configured to send the optical signal handed by the optical signal handover unit over to the sending carrier.

An optical receiver includes:

a third obtaining unit, configured to obtain a signal identifier of data to be received, where the third obtaining unit is further configured to obtain corresponding optical frequency slot OFS distribution information according to the obtained signal identifier; and a second optical signal receiving unit, configured to determine a corresponding receiving carrier according to the optical frequency slot distribution information obtained by the third obtaining unit, and receive, on the determined receiving carrier, an optical signal that carries the data to be received.

An optical network system includes the optical transmitter, the optical add/drop multiplexer, and the optical receiver.

In the embodiments of the present invention, the signal identifier of the data to be sent is obtained; the corresponding optical frequency slot distribution information is obtained according to the signal identifier; and the corresponding carrier is determined according to the obtained optical frequency slot distribution information, the determined carrier carries the data to be sent to generate an optical signal, and the generated optical signal is sent.

Compared with the prior art, the optical signal transmission method provided in the present invention does not fix the optical frequency slot distribution into a wavelength identifier, the number of optical frequency slots is not limited by the wavelength identifier field length, and the data to be sent can be transmitted in an optical network by being carried on the carrier determined according to multiple optical frequency slots.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

Embodiments of the present invention provide an optical signal transmission method, which can prevent an optical signal spectrum from being limited by a wavelength identifier byte length and enable one optical signal to occupy many OFSs while the optical signal is transmitted in an optical network. The embodiments of the present invention further provide a corresponding apparatus. The following gives detailed descriptions respectively.

Figure 1:
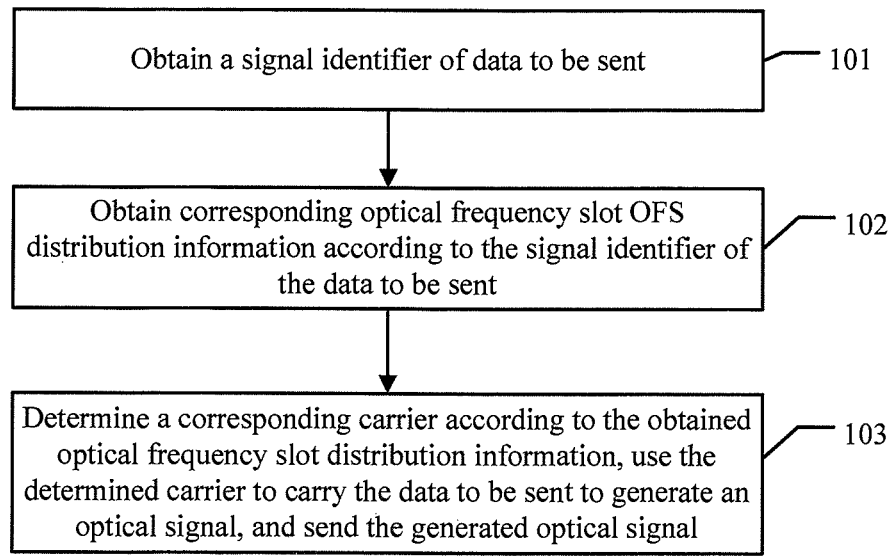
FIG. 1 is a schematic diagram of an optical signal transmission method according to an embodiment of the present invention.

Referring to FIG. 1, from a perspective of a transmitter, an optical signal transmission method provided in an embodiment of the present invention includes:

101. Obtain a signal identifier of data to be sent.

An optical signal is only a carrier. Transmission of the optical signal is not meaningful unless the optical signal carries data. The data to be sent has a unique signal identifier. The signal identifier of the data to be sent does not change even if the data to be sent is split into several parts. The signal identifier of each part of the data is the same as the signal identifier existent before the data is split.

102. Obtain corresponding optical frequency slot OFS distribution information according to the signal identifier of the data to be sent.

In the embodiment of the present invention, an optical frequency slot is a spectrum resource of a minimum spectrum width as far as a spectrum can be divided, that is, a minimum spectrum unit in the optical network as far as the spectrum can be divided. Therefore, the OFS distribution information refers to specific information available for determining a carrier, and the OFS distribution information is recorded in the following manner:

recording a nominal central frequency of a lowest-frequency OFS, and recording the number of continuously distributed OFSs, for example, the nominal central frequency of the lowest-frequency OFS is 12.5 GHz, and there are 20 continuously distributed OFSs; or recording a nominal central frequency of a lowest-frequency OFS, and recording the number of OFSs distributed according to a set law, for example, the nominal central frequency of the lowest-frequency OFS is 12.5 GHz, and there are 20 OFSs distributed at an interval of 1; or recording a nominal central frequency of a lowest-frequency OFS, and recording a linked list that denotes relative positions between the OFSs, for example, the nominal central frequency of the lowest-frequency OFS is 12.5 GHz, and a linked list of the relative positions between the OFSs is OFS1→OFS4→OFS6 . . . .

The corresponding optical frequency slot distribution information may be obtained in the following manner according to the signal identifier of the data to be sent:

The signal identifier of the data to be sent and the corresponding optical frequency slot distribution information are stored in a spectrum information table, and the spectrum information table is queried for the corresponding optical frequency slot distribution information according to the obtained signal identifier of the data to be sent, which may be understood by referring to Table 1:

TABLE 1

Spectrum information table

| Type identifier: indicates a spectrum information entry | Length: indicates a length of a spectrum information entry related to this signal |

ID of data to be sent: identifies the data to be sent
ID of path 1: identifies a path traveled by the optical signal
Upstream node ID: corresponds to an input direction
ID of fiber 1: identifies a fiber that sends an optical signal
OFS distribution information
Downstream node ID: corresponds to an output direction
. . .
. . .
. . .
ID of path x The content given in Table 1 is relatively complete. In fact, so long as the spectrum information table includes the signal identifier of the data to be sent and the optical frequency slot distribution information, the following elementary effect can be accomplished: The data to be sent is not limited by the wavelength field, and is transmitted by being carried on the carrier determined according to multiple optical frequency slots.

The content in the spectrum information table may be preset in the optical transmitter or determined through negotiation between an optical receiver and another optical network node or another optical receiver. Generally, the optical transmitter, the optical network node, and the optical receiver use their respective control and/or management interface to know identification information and spectrum information of the data to be sent, the data to be transmitted, and the data to be received. For the same data, the identification information is unchanged, which enables sending, forwarding or receiving of the optical signal.

The step of querying for the optical frequency slot distribution information with reference to spectrum information table 1 is equivalent to an indexing process. If the signal identifier of the data to be sent exists alone, the optical frequency slot distribution information may be obtained directly according to the signal identifier of the data to be sent. However, if path identifiers also exist under the signal identifier of the data to be sent, for example, if three path identifiers exist, which denote the ID of path 1, the ID of path 2, and the ID of path 3 respectively, the three path identifiers are found according to the signal identifier of the data to be sent, and then the corresponding optical frequency slot distribution information is obtained according to each path identifier. More specifically, the distribution information of one optical frequency slot is obtained according to the ID of path 1, the distribution information of one optical frequency slot is obtained according to the ID of path 2, and the distribution information of one optical frequency slot is obtained according to the ID of path 3.

Definitely, the path identifier may also be replaced with a fiber identifier. That is, if fiber identifiers also exist under the signal identifier of the data to be sent, for example, if three fiber identifiers exist, which denote the ID of fiber 1, the ID of fiber 2, and the ID of fiber 3 respectively, the three fiber identifiers are found according to the signal identifier of the data to be sent, and then the corresponding optical frequency slot distribution information is obtained according to each fiber identifier. More specifically, the distribution information of one optical frequency slot is obtained according to the ID of fiber 1, the distribution information of one optical frequency slot is obtained according to the ID of fiber 2, and the distribution information of one optical frequency slot is obtained according to the ID of fiber 3.

Definitely, fiber identifiers may further exist under a path identifier. That is, the corresponding path identifier is queried for according to the signal identifier, and then the corresponding fiber identifier is queried for according to the found path identifier, and the OFS distribution information corresponding to each fiber identifier is obtained. Specifically, three path identifiers found according to the signal identifier of the data to be sent are the ID of path 1, the ID of path 2, and the ID of path 3 respectively, and then the corresponding fiber identifier is found according to the ID of path 1. It is assumed that three fiber identifiers found according to the ID of path 1 are the ID of fiber 1, the ID of fiber 2, and the ID of fiber 3 respectively. Then the corresponding optical frequency slot distribution information is obtained according to each fiber identifier. For example, the distribution information of one optical frequency slot is obtained according to the ID of fiber 1, the distribution information of one optical frequency slot is obtained according to the ID of fiber 2, and the distribution information of one optical frequency slot is obtained according to the ID of fiber 3. Definitely, the corresponding fiber identifier can still be found according to the ID of path 2 and the ID of path 2, and the corresponding optical frequency slot distribution information is obtained according to each fiber identifier.

103. Determine a corresponding carrier according to the obtained optical frequency slot distribution information, use the determined carrier to carry the data to be sent to generate an optical signal, and send the generated optical signal.

Carrier is an abbreviation of carrier frequency. The corresponding carrier is determined according to the obtained optical frequency slot distribution information so as to limit the optical signal spectrum within a frequency range of the optical frequency slot distribution.

When the optical frequency slot distribution information is obtained directly according to the signal identifier of the data to be sent, the corresponding carrier is determined. If the optical frequency slot distribution information is: the nominal central frequency of the lowest-frequency OFS is 12.5 GHz, then it is determined that the width of the optical frequency slot is 25 GHz and there are 20 continuously distributed OFSs, and therefore, the corresponding carrier is determined as 0~500 GHz; if the optical frequency slot distribution information is: the nominal central frequency of the lowest-frequency OFS is 12.5 GHz and there are 20 OFSs distributed at an interval of 1, then it is determined that the corresponding carriers are 0~25 GHz, 25 GHz~75 GHz, 100 GHz~125 GHz, 150 GHz~175 GHz, 200 GHz~225 GHz . . . 975 GHz~1000 GHz; and, if the optical frequency slot distribution information is: the nominal central frequency of the lowest-frequency OFS is 12.5 GHz and a linked list of relative positions between the OFSs is OFS1→OFS4→OFS6→OFS10 . . . OFS50, the corresponding carriers are determined as 0~25 GHz, 75 GHz~100 GHz, 125 GHz~150 GHz, 225 GHz~250 GHz . . . 975 GHz~1000 GHz.

After the carrier is determined, the data to be sent is modulated onto the determined carrier to generate an optical signal. That is, the determined carrier carries the data to be sent to generate the optical signal, and the generated optical signal is sent.

When three path identifiers found according to the signal identifier of the data to be sent are the ID of path 1, the ID of path 2, and the ID of path 3 respectively, the optical frequency slot distribution information obtained according to the ID of path 1 is: the nominal central frequency of the lowest-frequency OFS is 12.5 GHz and there are 4 continuously distributed OFSs; the optical frequency slot distribution information obtained according to the ID of path 2 is: the nominal central frequency of the lowest-frequency OFS is 112.5 GHz and there are 8 continuously distributed OFSs; and the optical frequency slot distribution information obtained according to the ID of path 3 is: the nominal central frequency of the lowest-frequency OFS is 312.5 GHz and there are 8 continuously distributed OFSs, and therefore, according to the optical frequency slot distribution information corresponding to each path, it is determined that the corresponding carrier is 0~500 GHz.

After the carrier is determined, the data to be sent is modulated onto the determined carrier to generate an optical signal. That is, the determined carrier carries the data to be sent to generate the optical signal, and the corresponding optical signal is sent according to a path indicated by each path identifier. For the three paths mentioned here, the optical signal corresponding to each path identifier needs to be separated out before the optical signal is sent as indicated by the path identifier, that is, the corresponding data to be sent is separated out. If the optical frequency slot distribution information is not overlapped under each path identifier, the optical signal may be separated out by using an optical splitting component as indicated by the path identifier after an optical signal is generated; and, if the optical frequency slot distribution information is overlapped under each path identifier (the overlap here is understood as full overlap or partial overlap), the data to be sent may be separated out first and then the separated data is modulated onto the corresponding carrier.

Definitely, when three fiber identifiers found according to the signal identifier of the data to be sent are represented as the ID of fiber 1, the ID of fiber 2, and the ID of fiber 3 respectively, the specific principle is the same as those applied to the path identifier found according to the signal identifier of the data to be sent except that, at the time of sending the optical signal, the corresponding optical signal is sent according to a fiber indicated by the fiber identifier.

For now, the process of obtaining the optical frequency slot distribution information directly according to the fiber identifier of the data to be sent is called level-1 indexing, and the process of finding a path identifier or fiber identifier according to the fiber identifier of the data to be sent and then obtaining the corresponding optical frequency slot distribution information according to the path identifier or the fiber identifier is called level-2 indexing. In the level-2 indexing, no matter whether the optical frequency slot distribution information is obtained according to the path identifier or the fiber identifier, the purpose here is to clarify that the optical signal can be sent over multiple paths or multiple fibers.

The embodiments of the present invention cannot only clarify multi-path or multi-fiber sending, but also clarify both multi-path and multi-fiber sending, which may also be called level-3 indexing, as detailed below:

A corresponding path identifier is queried for according to the signal identifier of the data to be sent, and then a corresponding fiber identifier is queried for according to the found path identifier, and the OFS distribution information corresponding to each fiber identifier is obtained.

For example, three path identifiers found according to the signal identifier of the data to be sent are the ID of path 1, the ID of path 2, and the ID of path 3 respectively, the ID of fiber 1 and the ID of fiber 2 are found according to the ID of path 1, the ID of fiber 3 and the ID of fiber 4 are found according to the ID of path 2, and the ID of fiber 5 is found according to the ID of path 3.

The optical frequency slot distribution information obtained according to the ID of fiber 1 is: the nominal central frequency of the lowest-frequency OFS is 12.5 GHz and there are 4 continuously distributed OFSs; the optical frequency slot distribution information obtained according to the ID of fiber 2 is: the nominal central frequency of the lowest-frequency OFS is 112.5 GHz and there are 4 continuously distributed OFSs; and the optical frequency slot distribution information obtained according to the ID of fiber 3 is: the nominal central frequency of the lowest-frequency OFS is 212.5 GHz and there are 4 continuously distributed OFSs; the optical frequency slot distribution information obtained according to the ID of fiber 4 is: the nominal central frequency of the lowest-frequency OFS is 312.5 GHz and there are 4 continuously distributed OFSs; and the optical frequency slot distribution information obtained according to the ID of fiber 5 is: the nominal central frequency of the lowest-frequency OFS is 412.5 GHz and there are 4 continuously distributed OFSs, and therefore, according to the optical frequency slot distribution information corresponding to each fiber, it is determined that the corresponding carrier is 0~500 GHz; and the determined carrier carries the data to be sent to generate an optical signal, and the corresponding optical signal is sent according to the fiber indicated by each fiber identifier.

In the embodiment of the present invention, the signal identifier of the data to be sent is obtained; the corresponding optical frequency slot distribution information is obtained according to the signal identifier; and the corresponding carrier is determined according to the obtained optical frequency slot distribution information, the determined carrier carries the data to be sent to generate an optical signal, and the generated optical signal is sent. Compared with the prior art, the optical signal transmission method provided in the present invention does not fix the optical frequency slot distribution into a wavelength identifier, the number of optical frequency slots is not limited by the wavelength identifier field length, and the data to be sent can be transmitted in an optical network by being carried on the carrier determined according to multiple optical frequency slots.

In the embodiment of the present invention, the optical frequency slot distribution information is queried for by means of level-2 indexing and level-3 indexing, which further clarifies that the optical signal can be sent on multiple paths or/and multiple fibers, thereby being more suitable for networking of a super-large capacity required in the future.

Figure 2:
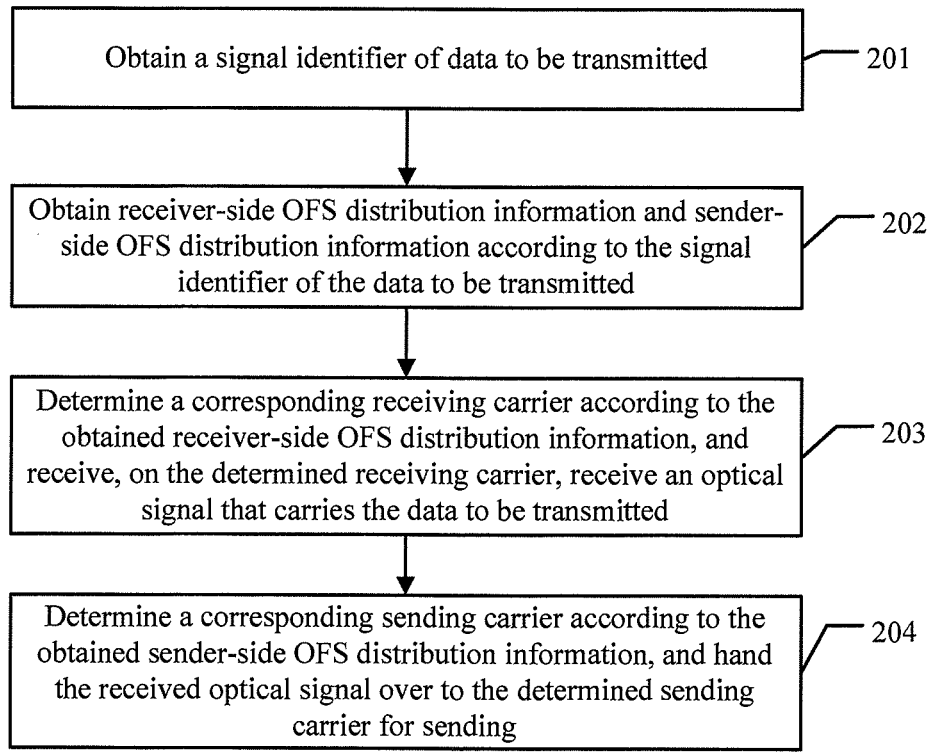
FIG. 2 is a schematic diagram of an optical signal transmission method according to another embodiment of the present invention.

Referring to FIG. 2, from a perspective of an optical add/drop multiplexer, an optical signal transmission method provided in another embodiment of the present invention includes:

201. Obtain a signal identifier of data to be transmitted.

A signal identifier on an optical receiver side is called a signal identifier of data to be sent, a signal identifier on an intermediate node is called a signal identifier of data to be transmitted, and a signal identifier on a receiver side is called a signal identifier of data to be received. In fact, for the data, the signal identifier remains unchanged, and its name is different when considered from a different perspective.

202. Obtain receiver-side OFS distribution information and sender-side OFS distribution information according to the signal identifier of the data to be transmitted.

If the intermediate node also uses the spectrum information table in the foregoing embodiment to store the signal identifier and the optical frequency slot distribution information, the spectrum information table of the intermediate node surely stores the receiver-side OFS distribution information and the sender-side OFS distribution information correspondingly. Definitely, the receiver-side OFS distribution information may be the same as or different from the sender-side OFS distribution information.

Considering the same case as that in the foregoing optical transmitter, the receiver-side OFS distribution information and the sender-side OFS distribution information may be obtained directly according to the signal identifier of the data to be transmitted, which is the case of level-1 indexing; or the corresponding path identifier is queried for according to the signal identifier of the data to be transmitted, and the receiver-side OFS distribution information and the sender-side OFS distribution information that are corresponding to each path on the receiver side are obtained, or a corresponding receiver-side fiber identifier and a corresponding sender-side fiber identifier are queried for according to the signal identifier, and the receiver-side OFS distribution information corresponding to the receiver-side fiber identifier and the sender-side OFS distribution information corresponding to the sender-side fiber identifier are obtained. The two cases are called level-2 indexing.

The corresponding path identifier is queried for according to the signal identifier, and then the corresponding receiver-side fiber identifier and the corresponding sender-side fiber identifier are queried for according to the found path identifier, and the receiver-side OFS distribution information corresponding to each receiver-side fiber identifier and the sender-side OFS distribution information corresponding to each sender-side fiber identifier are obtained. This case is called level-3 indexing.

203. Determine a corresponding receiving carrier according to the obtained receiver-side OFS distribution information, and receive, on the determined receiving carrier, an optical signal that carries the data to be transmitted.

The intermediate node does not know the receiving carrier of the optical signal to be transmitted, and can only obtain the corresponding OFS distribution information according to the signal identifier of the data to be received, so as to determine the corresponding receiving carrier. In this way, the optical signal that carries the data to be transmitted can be received on the determined receiving carrier.

For example, if the optical frequency slot distribution information on the receiver side is: the nominal central frequency of the lowest-frequency OFS is 12.5 GHz, it may be determined that the width of the optical frequency slot is 25 GHz and there are 20 continuously distributed OFSs, and therefore, it may be determined that the receiving carrier is 0~500 GHz. The optical frequency slot distribution information expressed in other forms may be understood by referring to the relevant content in the embodiment corresponding to the optical transmitter.

The details of determining the receiving carrier in the case of level-2 indexing mentioned in step 202 are: determining a corresponding receiving carrier according to the receiver-side OFS distribution information corresponding to each path identifier, and receiving, on the determined receiving carrier, the optical signal that carries the data to be transmitted; or, determining the corresponding receiving carrier according to the receiver-side OFS distribution information corresponding to each receiver-side fiber identifier, and receiving, on the determined receiving carrier, the optical signal that carries the data to be transmitted.

An example of the case of level-2 indexing mentioned in step 202 is given below: Three path identifiers found according to the signal identifier of the signal to be transmitted are the ID of path 1, the ID of path 2, and the ID of path 3 respectively, the optical frequency slot distribution information obtained according to the ID of path 1 is: the nominal central frequency of the lowest-frequency OFS is 12.5 GHz and there are 4 continuously distributed OFSs, and it may be determined that the receiving carrier of path 1 is 0~100 GHz; the optical frequency slot distribution information obtained according to the ID of path 2 is: the nominal central frequency of the lowest-frequency OFS is 112.5 GHz and there are 8 continuously distributed OFSs, and it may be determined that the receiving carrier of path 2 is 100~300 GHz; and the optical frequency slot distribution information obtained according to the ID of path 3 is: the nominal central frequency of the lowest-frequency OFS is 312.5 GHz and there are 8 continuously distributed OFSs, and it may be determined that the receiving carrier of path 3 is 300~500 GHz. Although a path identifier is described here as an example, the principle is the same when the path identifier is replaced with a receiver-side fiber identifier.

The details of determining the receiving carrier in the case of level-2 indexing mentioned in step 202 are: determining a corresponding receiving carrier according to the receiver-side OFS distribution information corresponding to each receiver-side fiber identifier, and receiving, on the determined receiving carrier, the optical signal that carries the data to be transmitted. The receiver-side fiber identifier mentioned in this paragraph is a corresponding receiver-side fiber identifier found according to the path identifier.

An example of the case of level-3 indexing mentioned in step 202 is given below: Three path identifiers found according to the signal identifier of the data to be sent are the ID of path 1, the ID of path 2, and the ID of path 3 respectively, the ID of receiver-side fiber 1 and the ID of receiver-side fiber 2 are found according to the ID of path 1, the ID of receiver-side fiber 3 and the ID of receiver-side fiber 4 are found according to the ID of path 2, and the ID of received-side fiber 5 is found according to the ID of path 3.

The optical frequency slot distribution information obtained according to the ID of receiver-side fiber 1 is: the nominal central frequency of the lowest-frequency OFS is 12.5 GHz and there are 4 continuously distributed OFSs, and it may be determined that the receiving carrier corresponding to the ID of receiver-side fiber 1 is 0~100 GHz; the optical frequency slot distribution information obtained according to the ID of fiber 2 is: the nominal central frequency of the lowest-frequency OFS is 112.5 GHz and there are 4 continuously distributed OFSs, and it may be determined that the receiving carrier corresponding to the ID of receiver-side fiber 2 is 100 GHz~200 GHz; the optical frequency slot distribution information obtained according to the ID of fiber 3 is: the nominal central frequency of the lowest-frequency OFS is 212.5 GHz and there are 4 continuously distributed OFSs, and it may be determined that the receiving carrier corresponding to the ID of receiver-side fiber is 200 GHz~300 GHz, the optical frequency slot distribution information obtained according to the ID of received-side fiber 4 is: the nominal central frequency of the lowest-frequency OFS is 312.5 GHz and there are 4 continuously distributed OFSs, and it may be determined that the receiving carrier corresponding to the ID of receiver-side fiber 2 is 300~400 GHz; and the optical frequency slot distribution information obtained according to the ID of received-side fiber 5 is: the nominal central frequency of the lowest-frequency OFS is 412.5 GHz and there are 4 continuously distributed OFSs, and it may be determined that the receiving carrier corresponding to the ID of receiver-side fiber 2 is 400 GHz~500 GHz.

204. Determine a corresponding sending carrier according to the obtained sender-side OFS distribution information, and hand the received optical signal over to the determined sending carrier for sending.

The determination of the sending carrier may be understood by referring to the receiving carrier in step 203 except that the determination is based on the sender-side OFS distribution information.

The details of the case of level-2 indexing are: determining a corresponding sending carrier according to the corresponding sender-side OFS distribution information under each path, handing the received optical signal over to the determined sending carrier, and sending the corresponding optical signal according to a path indicated by each path identifier; or, determining a corresponding sending carrier according to the sender-side OFS distribution information corresponding to each sender-side fiber identifier, handing the received optical signal over to the determined sending carrier, and sending the corresponding optical signal according to a fiber indicated by each sender-side fiber identifier.

The details of the case of level-2 indexing are: determining a corresponding sending carrier according to the sender-side OFS distribution information corresponding to each sender-side fiber identifier, handing the received optical signal over to the determined sending carrier, and sending the corresponding optical signal according to a fiber indicated by each sender-side fiber identifier.

If the receiver-side OFS distribution information is the same as the sender-side OFS distribution information, the receiving carrier is the same as the sending carrier.

If the receiver-side OFS distribution information is different from the sender-side OFS distribution information, the received optical signal needs to be modulated onto the sending carrier. Speaking with a simple example, when the receiving carrier is 0~100 GHz, and the sending carrier is 100 GHz~200 GHz, the receiving carrier needs to be modulated onto the sending carrier before the data is sent.

Step 204 may be understood by referring to the example in step 203, and is not detailed here any further.

In the embodiment of the present invention, the signal identifier of the data to be transmitted is obtained; the receiver-side OFS distribution information and the sender-side OFS distribution information are obtained according to the signal identifier; the corresponding receiving carrier is determined according to the obtained receiver-side OFS distribution information, and the optical signal that carries the data to be transmitted is received on the determined receiving carrier; and the corresponding sending carrier is determined according to the obtained sender-side OFS distribution information, and the received optical signal is handed over to the determined sending carrier for sending. Compared with the prior art, the optical signal transmission method provided in the present invention does not fix the optical frequency slot distribution into a wavelength identifier, the number of optical frequency slots is not limited by the wavelength identifier field length, and the data to be sent can be transmitted in an optical network by being carried on the carrier determined according to multiple optical frequency slots.

In the embodiment of the present invention, the optical frequency slot distribution information is queried for by means of level-2 indexing and level-3 indexing, which further clarifies that the optical signal can be sent on multiple paths or/and multiple fibers, thereby being more suitable for networking of a super-large capacity required in the future.

Figure 3:
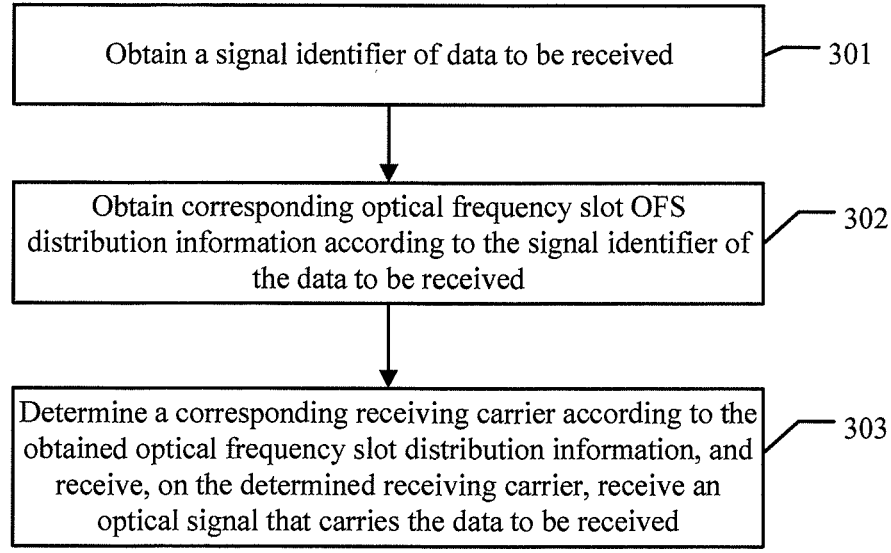
FIG. 3 is a schematic diagram of an optical signal transmission method according to another embodiment of the present invention.

Referring to FIG. 3, from a perspective of an optical receiver, an optical signal transmission method provided in another embodiment of the present invention includes:

301. Obtain a signal identifier of data to be received.

A signal identifier of the data to be received is termed from the perspective of the optical receiver, and is actually the same as the signal identifier of the data to be sent and the signal identifier of the data to be transmitted in the foregoing embodiments.

302. Obtain corresponding optical frequency slot OFS distribution information according to the signal identifier of the data to be received.

In this embodiment, the optical frequency slot OFS distribution information may be obtained in several scenarios. The OFS distribution information may be obtained directly according to the signal identifier of the data to be received. If the nominal central frequency of the lowest-frequency OFS is 12.5 GHz, it may be determined that the width of the optical frequency slot is 25 GHz and there are 20 continuously distributed OFSs, and therefore, it may be determined that the receiving carrier is 0~500 GHz. The optical frequency slot distribution information expressed in other forms may be understood by referring to the relevant content in the embodiment corresponding to the optical transmitter.

Alternatively, the case of level-2 indexing may be: querying for a corresponding path identifier or fiber identifier according to the signal identifier, and obtaining the OFS distribution information corresponding to each path identifier or each fiber identifier.

Alternatively, the case of level-3 indexing may be: querying for a corresponding path identifier according to the signal identifier, and then querying for a corresponding fiber identifier according to the found path identifier, and obtaining the OFS distribution information corresponding to each fiber identifier.

Examples for each scenario in this embodiment are the same as those in the optical add/drop multiplexer, and are not described here any further.

303. Determine a corresponding receiving carrier according to the obtained optical frequency slot distribution information, and receive, on the determined receiving carrier, an optical signal that carries the data to be received.

If the determined receiving carrier is 0~500 GHz, this band is used to receive the optical signal that carries the data to be received.

For the case of level-2 indexing: a corresponding receiving carrier is determined according to the OFS distribution information corresponding to each path identifier or each fiber identifier, and the optical signal that carries the data to be received is received on the determined corresponding receiving carrier according to the path indicated by the path identifier or the fiber indicated by the fiber identifier.

For the case of level-3 indexing: the corresponding receiving carrier is determined according to the OFS distribution information corresponding to each fiber identifier, and the optical signal that carries the data to be received is received on the determined receiving carrier. The fiber identifier mentioned in this paragraph is a fiber identifier found according to the path identifier.

In the embodiment of the present invention, the signal identifier of the data to be received is obtained; the corresponding optical frequency slot OFS distribution information is obtained according to the signal identifier; and the corresponding receiving carrier is determined according to the obtained optical frequency slot distribution information, and the optical signal that carries the data to be received is received on the determined receiving carrier. Compared with the prior art, the optical signal transmission method provided in the present invention does not fix the optical frequency slot distribution into a wavelength identifier, the number of optical frequency slots is not limited by the wavelength identifier field length, and the data to be sent can be transmitted in an optical network by being carried on the carrier determined according to multiple optical frequency slots.

In the embodiment of the present invention, the optical frequency slot distribution information is queried for by means of level-2 indexing and level-3 indexing, which further clarifies that the optical signal can be sent on multiple paths or/and multiple fibers, thereby being more suitable for networking of a super-large capacity required in the future.

Figure 4:
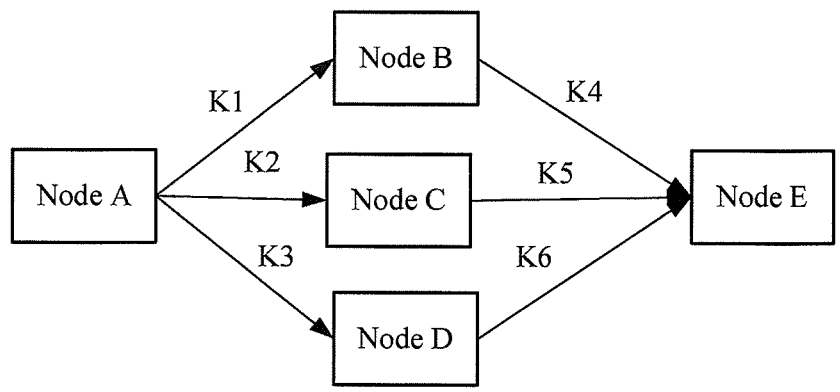
FIG. 4 is a schematic diagram of an application scenario of a method according to an embodiment of the present invention.

For ease of understanding, the following describes an optical signal transmission method in a variable-bandwidth network in an embodiment of the present invention by using a specific application scenario as an example, as detailed below:

Referring to FIG. 4, an optical network includes a total of five optical network nodes ranging from an optical network node A to an optical network node E, where A is an optical network node for sending optical signals, such as an optical transmitter; B, C, and D are optical network nodes for relaying optical signals, such as an optical add/drop multiplexer; and E is an optical network node for receiving optical signals, such as an optical receiver. The signal flow direction is indicated by an arrow in FIG. 4. A signal is transmitted from the optical network node A to the optical network nodes B, C, and D, and then from the optical network nodes B, C, and D to the optical network node E. The transmitting optical network node, the relaying optical network nodes, and the receiving optical network node are interconnected by a fiber. At least one fiber exists between every two nodes. Seen from a perspective of the optical network node A, the optical network nodes B, C, and D are its downstream nodes; seen from a perspective of B, C, and D, the optical network node A is their upstream optical network node, and the optical network node E is their downstream optical network node; and, seen from a perspective of E, the optical network nodes B, C, and D are their upstream optical network nodes. Although the optical network nodes are used as examples in this application scenario, the optical signal may also be transmitted from the transmitter to the receiver directly in a point-to-point manner. In most scenarios, multiple optical transmitters, multiple optical add/drop multiplexers and multiple optical receivers exist in an optical network. Regardless of the number of the optical network nodes in an optical network, the transmission principles are the same. The following describes FIG. 4 in detail.

Identification information of the data to be sent and the corresponding optical frequency slot distribution information are stored in a transmitter correspondingly. The ID of path 1, the ID of path 2, and the ID of path 3 may be found according to the identification information of the data to be sent. The fiber K1 is found according to the ID of path 1, the fiber K2 is found according to the ID of path 2, and the fiber K3 is found according to the ID of path 3. The optical frequency slot distribution information obtained according to the fiber K1 is: the nominal central frequency of the lowest-frequency OFS is 12.5 GHz and there are 4 continuously distributed OFSs; the optical frequency slot distribution information obtained according to the fiber K2 is: the nominal central frequency of the lowest-frequency OFS is 112.5 GHz and there are 8 continuously distributed OFSs; and the optical frequency slot distribution information obtained according to the fiber K3 is: the nominal central frequency of the lowest-frequency OFS is 312.5 GHz and there are 8 continuously distributed OFSs. It is determined that the corresponding carrier is 0~500 GHz, and the corresponding carrier is selected for carrying the data to be sent to generate an optical signal. Over path 1 (A→B→E), the fiber K1 sends an optical signal whose carrier is 0~100 GHz; over path 2 (A→C→E), the fiber K2 sends an optical signal whose carrier is 100 GHz~300 GHz; and, over path 3 (A→D→E), the fiber K3 sends an optical signal whose carrier is 300 GHz~500 GHz.

For the receiving, handover and sending processes of the intermediate optical nodes B, C, and D, reference may be made to the processes in the optical add/drop multiplexer. The difference is that the sending is performed according to the fibers K4, K5, and K6 when the sending is performed according to fibers.

The receiving performed by the optical node E may be understood by referring to the example given in the description of the optical transmitter.

In this application scenario, the processes of generating, sending, relaying and receiving an optical signal are described on the whole. In each process, it is only necessary to obtain the optical frequency slot distribution information according to the signal identifier of the data. The optical frequency slot distribution information is not written in a wavelength identifier, and the processes are not limited by the wavelength identifier.

Figure 5:
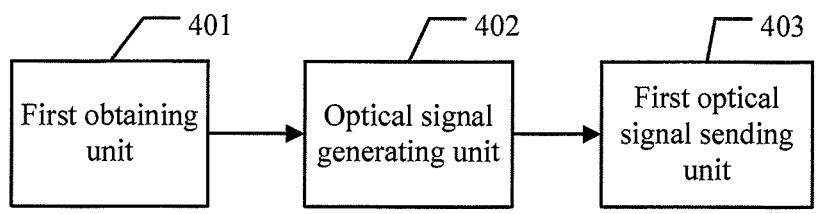
FIG. 5 is a schematic diagram of an optical transmitter according to an embodiment of the present invention.

Referring to FIG. 5, an optical transmitter provided in an embodiment of the present invention includes:

a first obtaining unit 401, configured to obtain a signal identifier of data to be sent, where the first obtaining unit 401 is further configured to obtain corresponding optical frequency slot OFS distribution information according to the signal identifier;

an optical signal generating unit 402, configured to determine a corresponding carrier according to the optical frequency slot distribution information obtained by the first obtaining unit 401, and use the determined carrier to carry the data to be sent to generate an optical signal; and a first optical signal sending unit 404, configured to send the optical signal generated by the optical signal generating unit 402.

In the embodiment of the present invention, the first obtaining unit 401 obtains the signal identifier of the data to be sent, the first obtaining unit 401 obtains the corresponding optical frequency slot OFS distribution information according to the signal identifier, and the optical signal generating unit 402 determines the corresponding carrier according to the optical frequency slot distribution information obtained by the first obtaining unit 401; and the determined carrier carries the data to be sent to generate an optical signal, and the first optical signal sending unit 403 sends the optical signal generated by the optical signal generating unit 402. Compared with the prior art, the optical transmitter of optical signals provided in the present invention does not fix the optical frequency slot distribution into a wavelength identifier, the number of optical frequency slots is not limited by the wavelength identifier field length, and the data to be sent can be transmitted in an optical network by being carried on the carrier determined according to multiple optical frequency slots.

Figure 6:
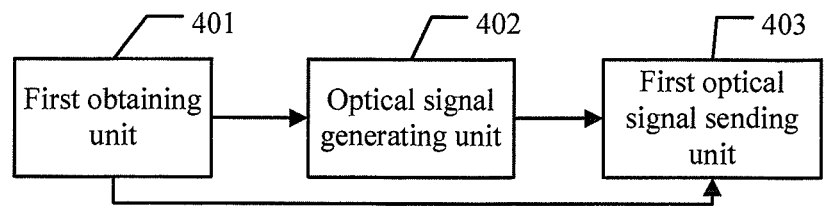
FIG. 6 is a schematic diagram of an optical transmitter according to another embodiment of the present invention.

Referring to FIG. 6, an optical transmitter in an embodiment of the present invention further includes:

a first obtaining unit 401, further configured to query for a corresponding path identifier or fiber identifier according to the obtained signal identifier, and obtain the OFS distribution information corresponding to each path identifier or each fiber identifier;

an optical signal generating unit 402, further configured to determine a corresponding carrier according to the OFS distribution information corresponding to each path identifier or each fiber identifier and obtained by the first obtaining unit 401, and use the determined carrier to carry the data to be sent to generate an optical signal; and a first optical signal sending unit 403, further configured to send, according to a path indicated by each path identifier or a fiber indicated by each fiber identifier, the corresponding optical signal generated by the optical signal generating unit 402.

In the embodiment of the present invention, the first obtaining unit 401 queries for the corresponding path identifier or fiber identifier according to the obtained signal identifier, and obtains the OFS distribution information corresponding to each path identifier or each fiber identifier; and the optical signal generating unit 402 determines the corresponding carrier according to the OFS distribution information corresponding to each path identifier or each fiber identifier obtained by the first obtaining unit 401, and the determined carrier carries the data to be sent to generate an optical signal; and the first optical signal sending unit 403 sends the corresponding optical signal generated by the optical signal generating unit 402 according to the path indicated by each path identifier or the fiber indicated by each fiber identifier. Compared with the prior art, the embodiment of the present invention further clarifies that the optical transmitter provided in the embodiment of the present invention obtains the optical frequency slot distribution information by means of level-2 indexing, and further clarifies that the optical signal can be sent on multiple paths or multiple fibers, thereby being more suitable for networking of a super-large capacity required in the future.

Referring to FIG. 6, an optical transmitter in an embodiment of the present invention may further include:

a first obtaining unit 401, further configured to query for a corresponding path identifier according to the obtained signal identifier, and then query for a corresponding fiber identifier according to the found path identifier, and obtain the OFS distribution information corresponding to each fiber identifier;

an optical signal generating unit 402, further configured to determine a corresponding carrier according to the OFS distribution information corresponding to each fiber identifier and obtained by the first obtaining unit 401, and use the determined carrier to carry the data to be sent to generate an optical signal; and a first optical signal sending unit 403, further configured to send, according to a fiber indicated by each fiber identifier, the corresponding optical signal generated by the optical signal generating unit 402.

In the embodiment of the present invention, the first obtaining unit 401 queries for the corresponding path identifier according to the obtained signal identifier, and then queries for the corresponding fiber identifier according to the found path identifier, and obtains the OFS distribution information corresponding to each fiber identifier; and the optical signal generating unit 402 determines the corresponding carrier according to the OFS distribution information corresponding to each fiber identifier obtained by the first obtaining unit 401, and the determined carrier carries the data to be sent to generate an optical signal; and the first optical signal sending unit 403 sends the corresponding optical signal generated by the optical signal generating unit 402 according to the fiber indicated by each fiber identifier. Compared with the prior art, the embodiment of the present invention further clarifies that the optical transmitter provided in the embodiment of the present invention obtains the optical frequency slot distribution information by means of level-3 indexing, and further clarifies that the optical signal can be sent on multiple paths and multiple fibers, thereby being more suitable for networking of a super-large capacity required in the future.

Figure 7:
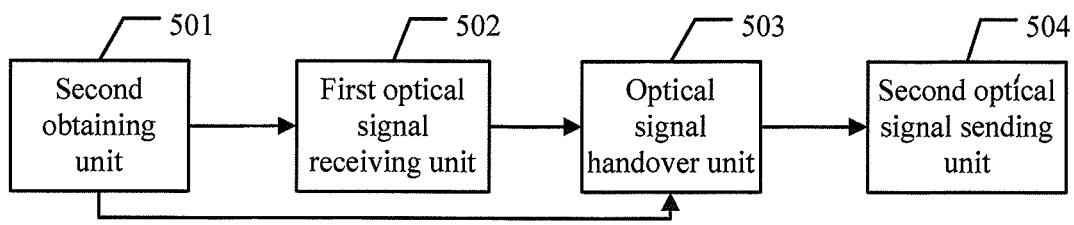
FIG. 7 is a schematic diagram of an optical add/drop multiplexer according to an embodiment of the present invention.

Referring to FIG. 7, an optical add/drop multiplexer in an embodiment of the present invention includes:

a second obtaining unit 501, configured to obtain a signal identifier of data to be transmitted, where the second obtaining unit 501 is further configured to obtain receiver-side OFS distribution information and sender-side OFS distribution information according to the obtained signal identifier;

a first optical signal receiving unit 502, configured to determine a corresponding receiving carrier according to the receiver-side OFS distribution information obtained by the second obtaining unit 501, and receive, on the determined receiving carrier, an optical signal that carries the data to be transmitted;

an optical signal handover unit 503, configured to determine a corresponding sending carrier according to the sender-side OFS distribution information obtained by the second obtaining unit 501, and hand the optical signal received by the first optical signal receiving unit 502 over to the determined sending carrier; and a second optical signal sending unit 504, configured to send the optical signal handed by the optical signal handover unit 503 over to the sending carrier.

In the embodiment of the present invention, the second obtaining unit 501 obtains the signal identifier of the data to be transmitted; the second obtaining unit 501 obtain the receiver-side OFS distribution information and the sender-side OFS distribution information according to the obtained signal identifier; the first optical signal receiving unit 502 determines the corresponding receiving carrier according to the receiver-side OFS distribution information obtained by the second obtaining unit 501, and receives, on the determined receiving carrier, the optical signal that carries the data to be transmitted; the optical signal handover unit 503 determines the corresponding sending carrier according to the sender-side OFS distribution information obtained by the second obtaining unit 501, and hands the optical signal received by the first optical signal receiving unit 502 over to the determined sending carrier; and the second optical signal sending unit 504 sends the optical signal that is handed by the optical signal handover unit 503 over to the sending carrier. Compared with the prior art, the optical add/drop multiplexer of optical signals provided in the present invention does not fix the optical frequency slot distribution into a wavelength identifier, the number of optical frequency slots is not limited by the wavelength identifier field length, and the data to be sent can be transmitted in an optical network by being carried on the carrier determined according to multiple optical frequency slots.

Figure 8:
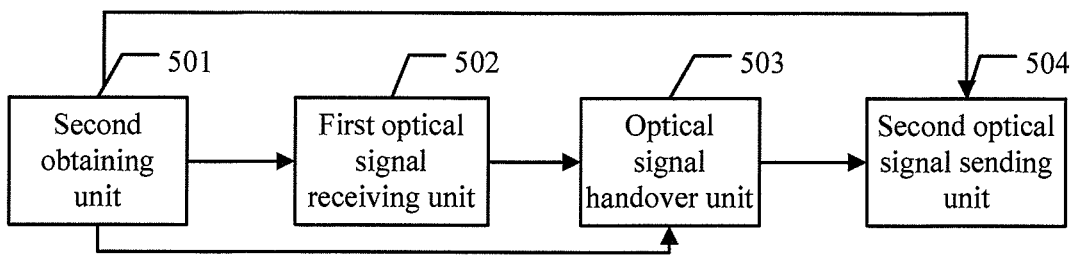
FIG. 8 is a schematic diagram of an optical add/drop multiplexer according to an embodiment of the present invention.

Referring to FIG. 8, an optical add/drop multiplexer in an embodiment of the present invention further includes:

a second obtaining unit 501, further configured to query for a corresponding path identifier according to the obtained signal identifier, and obtain the receiver-side OFS distribution information and the sender-side OFS distribution information that are corresponding to each path on a receiver side;

a first optical signal receiving unit 502, further configured to determine a corresponding receiving carrier according to the receiver-side OFS distribution information corresponding to each path identifier and obtained by the second obtaining unit 501, and receive, on the determined receiving carrier, the optical signal that carries the data to be transmitted;

an optical signal handover unit 503, further configured to determine a corresponding sending carrier according to the corresponding sender-side OFS distribution information under each path and obtained by the second obtaining unit 501, and hand the optical signal received by the first optical signal receiving unit 502 over to the determined sending carrier; and a second optical signal sending unit 504, further configured to send, according to a path indicated by each path identifier obtained by the second obtaining unit 501, the corresponding optical signal handed over by the optical signal handover unit 503.

In the embodiment of the present invention, the second obtaining unit 501 queries for the corresponding path identifier according to the obtained signal identifier, and obtains the receiver-side OFS distribution information and the sender-side OFS distribution information that are corresponding to each path on the receiver side; the first optical signal receiving unit 502 determines the corresponding sending carrier according to the corresponding sender-side OFS distribution information under each path and obtained by the second obtaining unit 501, and the optical signal received by the first optical signal receiving unit 502 is handed over to the determined sending carrier; the optical signal handover unit 503 determines the corresponding sending carrier according to the corresponding sender-side OFS distribution information under each path and obtained by the second obtaining unit 501, and hands the optical signal received by the first optical signal receiving unit 502 over to the determined sending carrier; and, according to the path indicated by each path identifier obtained by the second obtaining unit 501, the second optical signal sending unit 504 sends the corresponding optical signal that is handed over by the optical signal handover unit 503. Compared with the prior art, the embodiment of the present invention further clarifies that the optical add/drop multiplexer provided in the embodiment of the present invention obtains the optical frequency slot distribution information by means of level-2 indexing, and further clarifies that the optical signal can be transmitted on multiple paths, thereby being more suitable for networking of a super-large capacity required in the future.

Referring to FIG. 8, an optical add/drop multiplexer in an embodiment of the present invention further includes:

a second obtaining unit 501, further configured to query for a corresponding receiver-side fiber identifier and a corresponding sender-side fiber identifier according to the obtained signal identifier, and obtain the receiver-side OFS distribution information corresponding to the receiver-side fiber identifier and the sender-side OFS distribution information corresponding to the sender-side fiber identifier;

a first optical signal receiving unit 502, further configured to determine a corresponding receiving carrier according to the receiver-side OFS distribution information corresponding to each receiver-side fiber identifier and obtained by the second obtaining unit 501, and receive, on the determined receiving carrier, the optical signal that carries the data to be transmitted;

an optical signal handover unit 503, further configured to determine a corresponding sending carrier according to the sender-side OFS distribution information corresponding to each sender-side fiber identifier and obtained by the second obtaining unit 501, and hand the optical signal received by the first optical signal receiving unit 502 over to the determined sending carrier; and a second optical signal sending unit 504, further configured to send, according to a fiber indicated by each sender-side fiber identifier obtained by the second obtaining unit 501, the corresponding optical signal handed over by the optical signal handover unit.

In the embodiment of the present invention, the second obtaining unit 501 queries for the corresponding receiver-side fiber identifier and the sender-side fiber identifier according to the obtained signal identifier, and obtains the receiver-side OFS distribution information corresponding to the receiver-side fiber identifier and the sender-side OFS distribution information corresponding to the sender-side fiber identifier; the first optical signal receiving unit 502 determines the corresponding receiving carrier according to the receiver-side OFS distribution information corresponding to each receiver-side fiber identifier obtained by the second obtaining unit 501, and the optical signal that carries the data to be transmitted is received on the determined receiving carrier; the optical signal handover unit 503 determines the corresponding sending carrier according to the sender-side OFS distribution information corresponding to each sender-side fiber identifier and obtained by the second obtaining unit 501, and hands the optical signal received by the first optical signal receiving unit 502 over to the determined sending carrier; and, according to the fiber indicated by each sender-side fiber identifier obtained by the second obtaining unit 501, the second optical signal sending unit 504 sends the corresponding optical signal that is handed over by the optical signal handover unit. The embodiment of the present invention further clarifies that the optical add/drop multiplexer provided in the embodiment of the present invention obtains the optical frequency slot distribution information by means of level-2 indexing, and further clarifies that the optical signal can be transmitted on multiple fibers, thereby being more suitable for networking of a super-large capacity required in the future.

Referring to FIG. 8, an optical add/drop multiplexer in an embodiment of the present invention further includes:

a second obtaining unit 501, further configured to query for a corresponding path identifier according to the obtained signal identifier, and then query for a corresponding receiver-side fiber identifier and a corresponding sender-side fiber identifier according to the found path identifier, and obtain the receiver-side OFS distribution information corresponding to each receiver-side fiber identifier and the sender-side OFS distribution information corresponding to each sender-side fiber identifier;

a first optical signal receiving unit 502, further configured to determine a corresponding receiving carrier according to the receiver-side OFS distribution information corresponding to each receiver-side fiber identifier and obtained by the second obtaining unit, and receive, on the determined receiving carrier, the optical signal that carries the data to be transmitted;

an optical signal handover unit 503, further configured to determine a corresponding sending carrier according to the sender-side OFS distribution information corresponding to each sender-side fiber identifier and obtained by the second obtaining unit, and hand the optical signal received by the first optical signal receiving unit over to the determined sending carrier; and a second optical signal sending unit 504, further configured to send, according to a fiber indicated by each sender-side fiber identifier obtained by the second obtaining unit, the corresponding optical signal handed over by the optical signal handover unit.

In the embodiment of the present invention, the second obtaining unit 501 queries for the corresponding path identifier according to the obtained signal identifier, and then queries for the corresponding receiver-side fiber identifier and the sender-side fiber identifier according to the found path identifier, and obtains the receiver-side OFS distribution information corresponding to each receiver-side fiber identifier and the sender-side OFS distribution information corresponding to each sender-side fiber identifier; the first optical signal receiving unit 502 determines the corresponding receiving carrier according to the receiver-side OFS distribution information corresponding to each receiver-side fiber identifier obtained by the second obtaining unit 501, and receives, on the determined receiving carrier, the optical signal that carries the data to be transmitted; the optical signal handover unit 503 determines the corresponding sending carrier according to the sender-side OFS distribution information corresponding to each sender-side fiber identifier and obtained by the second obtaining unit, and hands the optical signal received by the first optical signal receiving unit over to the determined sending carrier; and, according to the fiber indicated by each sender-side fiber identifier obtained by the second obtaining unit, the second optical signal sending unit 504 sends the corresponding optical signal that is handed over by the optical signal handover unit. The embodiment of the present invention further clarifies that the optical add/drop multiplexer provided in the embodiment of the present invention can also obtain the optical frequency slot distribution information by means of level-3 indexing, and further clarifies that the optical signal can be transmitted on multiple paths and multiple fibers, thereby being more suitable for networking of a super-large capacity required in the future.

Figure 9:
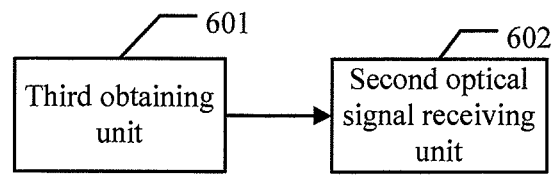
FIG. 9 is a schematic diagram of an optical receiver according to an embodiment of the present invention.

Referring to FIG. 9, an optical receiver provided in an embodiment of the present invention includes:

a third obtaining unit 601, configured to obtain a signal identifier of data to be received, where the third obtaining unit 601 is further configured to obtain corresponding optical frequency slot OFS distribution information according to the obtained signal identifier; and a second optical signal receiving unit 602, configured to determine a corresponding receiving carrier according to the optical frequency slot distribution information obtained by the third obtaining unit 601, and receive, on the determined receiving carrier, an optical signal that carries the data to be received.

In the embodiment of the present invention, the third obtaining unit 601 obtains the signal identifier of the data to be received; the third obtaining unit 601 obtains the corresponding optical frequency slot OFS distribution information according to the obtained signal identifier; and the second optical signal receiving unit 602 determines the corresponding receiving carrier according to the optical frequency slot distribution information obtained by the third obtaining unit 601, and receives, on the determined receiving carrier, the optical signal that carries the data to be received. Compared with the prior art, the optical signal receiver provided in the present invention does not fix the optical frequency slot distribution into a wavelength identifier, the number of optical frequency slots is not limited by the wavelength identifier field length, and the data to be sent can be transmitted in an optical network by being carried on the carrier determined according to multiple optical frequency slots.

Referring to FIG. 9, an optical receiver in an embodiment of the present invention further includes:

a third obtaining unit 301, further configured to query for a corresponding path identifier or fiber identifier according to the obtained signal identifier, and obtain the OFS distribution information corresponding to each path identifier or each fiber identifier; and a second optical signal receiving unit 302, further configured to determine a corresponding receiving carrier according to the OFS distribution information corresponding to each path identifier or each fiber identifier and obtained by the third obtaining unit 301, and receive, on the determined receiving carrier, the optical signal that carries the data to be received.

In the embodiment of the present invention, the third obtaining unit 301 queries for the corresponding path identifier or fiber identifier according to the obtained signal identifier, and obtains the OFS distribution information corresponding to each path identifier or each fiber identifier; and the second optical signal receiving unit 302 determines the corresponding receiving carrier according to the OFS distribution information corresponding to each path identifier or each fiber identifier obtained by the third obtaining unit 301, and receives, on the determined receiving carrier, the optical signal that carries the data to be received. The embodiment of the present invention further clarifies that the optical receiver provided in the embodiment of the present invention obtains the optical frequency slot distribution information by means of level-2 indexing, and further clarifies that the optical signal can be sent on multiple paths or multiple fibers, thereby being more suitable for networking of a super-large capacity required in the future.

Referring to FIG. 9, an optical receiver in an embodiment of the present invention may further include:

a third obtaining unit 601, further configured to query for a corresponding path identifier according to the obtained signal identifier, and then query for a corresponding fiber identifier according to the found path identifier, and obtain the OFS distribution information corresponding to each fiber identifier; and a second optical signal receiving unit 602, further configured to determine a corresponding receiving carrier according to the OFS distribution information corresponding to each path identifier or each fiber identifier and obtained by the third obtaining unit 601, and receive, on the determined receiving carrier, the optical signal that carries the data to be received.

In the embodiment of the present invention, the third obtaining unit 601 queries for the corresponding path identifier according to the obtained signal identifier, and then queries for the corresponding fiber identifier according to the found path identifier, and obtains the OFS distribution information corresponding to each fiber identifier; and the second optical signal receiving unit 602 determines the corresponding receiving carrier according to the OFS distribution information corresponding to each path identifier or each fiber identifier obtained by the third obtaining unit 601, and receives, on the determined receiving carrier, the optical signal that carries the data to be received. The embodiment of the present invention further clarifies that the optical receiver provided in the embodiment of the present invention can also obtain the optical frequency slot distribution information by means of level-3 indexing, and further clarifies that the optical signal can be transmitted on multiple paths and multiple fibers, thereby being more suitable for networking of a super-large capacity required in the future.

Figure 10:
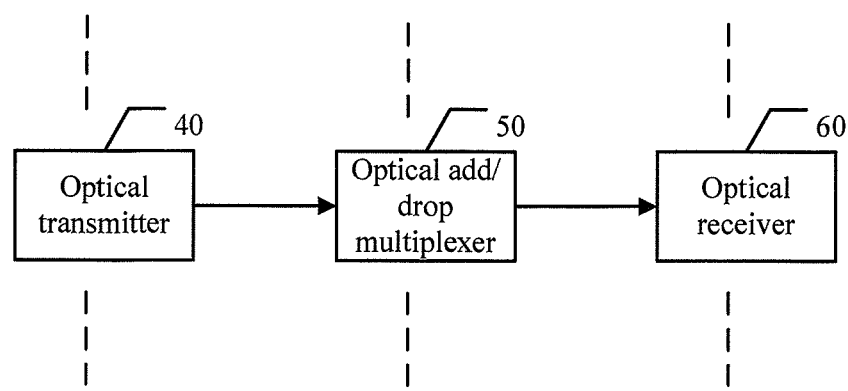
FIG. 10 is schematic diagram of an optical network system according to an embodiment of the present invention.

Referring to FIG. 10, an optical network system provided in an embodiment of the present invention includes at least one optical transmitter 40 described in the foregoing embodiments, at least one optical add/drop multiplexer 50 described in the foregoing embodiments, and at least one optical receiver 60 described in the foregoing embodiments. The optical add/drop multiplexer is connected between the optical transmitter and the optical receiver through a fiber, and is configured to forward an optical signal transmitted by the optical transmitter.

In fact, in the foregoing optical network embodiment, the optical add/drop multiplexer 50 may be omitted, and the optical signal is received by the optical receiver 60 directly after being transmitted by the optical transmitter 40.

The upstream optical node and the downstream optical node mentioned herein refer mostly to the optical add/drop multiplexer (or a node with the optical add/drop multiplexing function). In fact, many optical add/drop multiplexers exist in an optical network, and an optical signal transmitted by a transmitter may arrive at the optical receiver after being forwarded by many optical add/drop multiplexers.

A person of ordinary skill in the art may understand that all or a part of the steps of the methods in the embodiments may be implemented by a program instructing relevant hardware. The program may be stored in a computer readable storage medium. The storage medium may include: a read-only memory, a magnetic disk, or an optical disc.

The foregoing has described in detail an optical signal transmission method, apparatus and system provided in the present invention. A person of ordinary skill in the art may make modifications to the specific implementation manners and the application scope according to the ideas of the embodiments of the present invention. Therefore, the content of the specification shall not be construed as a limitation to the present invention.

What is claimed is:

1. An optical signal transmission method, comprising:
obtaining a signal identifier of data to be sent;
obtaining corresponding optical frequency slot (OFS) distribution information according to the signal identifier, comprising:
querying for a corresponding path identifier or fiber identifier according to the signal identifier, and
obtaining the OFS distribution information corresponding to each path identifier or each fiber identifier;
using a determined corresponding carrier to carry the data to be sent to generate an optical signal, comprising:
determining the corresponding carrier according to the OFS distribution information corresponding to each path identifier or each fiber identifier obtained, and
using the determined carrier to carry the data to be sent to generate the optical signal; and
sending the corresponding generated optical signal according to a path indicated by each path identifier or a fiber indicated by each fiber identifier.

2. The optical signal transmission method according to claim 1, wherein the OFS distribution information is recorded in the following manner:
recording a nominal central frequency of a lowest-frequency OFS, and recording the number of continuously distributed OFSs; or
recording a nominal central frequency of a lowest-frequency OFS, and recording the number of OFSs distributed according to a set law; or
recording a nominal central frequency of a lowest-frequency OFS, and recording a linked list that denotes relative positions between the OFSs.

3. An optical signal transmission method, comprising:
obtaining a signal identifier of data to be sent;
obtaining corresponding optical frequency slot (OFS) distribution information according to the signal identifier, comprising:
querying for a corresponding path identifier according to the signal identifier,
querying for a corresponding fiber identifier according to a found path identifier, and
obtaining the OFS distribution information corresponding to each fiber identifier;
using a determined corresponding carrier to carry the data to be sent to generate an optical signal, comprising:
determining the corresponding carrier according to the OFS distribution information corresponding to each fiber identifier obtained, and
using the determined carrier to carry the data to be sent to generate the optical signal; and
sending the corresponding generated optical signal according to a fiber indicated by each fiber identifier.

4. An optical signal transmission method, comprising:
obtaining a signal identifier of data to be transmitted;
obtaining receiver-side optical frequency slot (OFS) distribution information and sender-side OFS distribution information according to the signal identifier, comprising:
   querying for a corresponding path identifier according to the signal identifier, and
   obtaining the receiver-side OFS distribution information and the sender-side OFS distribution information that are corresponding to each path on a receiver side;
receiving, on a determined receiving carrier, an optical signal that carries the data to be transmitted, comprising:
   determining a corresponding receiving carrier according to the receiver-side OFS distribution information corresponding to each path identifier, and
   receiving, on the determined receiving carrier, the optical signal that carries the data to be transmitted; and
handing the received optical signal over to a sending carrier for sending, comprising:
   determining a corresponding sending carrier according to the corresponding sender-side OFS distribution information under each path,
   handing the received optical signal over to the determined sending carrier, and
   sending the optical signal according to a path indicated by each path identifier.

5. An optical signal transmission method, comprising:
obtaining a signal identifier of data to be transmitted;
obtaining receiver-side optical frequency slot (OFS) distribution information and sender-side OFS distribution information according to the signal identifier, comprising:
   querying for a corresponding receiver-side fiber identifier and a corresponding sender-side fiber identifier according to the signal identifier, and
   obtaining the receiver-side OFS distribution information corresponding to the receiver-side fiber identifier and the sender-side OFS distribution information corresponding to the sender-side fiber identifier;
receiving, on a determined receiving carrier, an optical signal that carries the data to be transmitted, comprising:
   determining a corresponding receiving carrier according to the receiver-side OFS distribution information corresponding to each receiver-side fiber identifier, and
   receiving, on the determined receiving carrier, the optical signal that carries the data to be transmitted; and
handing the received optical signal over to a sending carrier for sending, comprising:
   determining a corresponding sending carrier according to the sender-side OFS distribution information corresponding to each sender-side fiber identifier,
   handing the received optical signal over to the determined sending carrier, and
   sending the optical signal according to a fiber indicated by each sender-side fiber identifier.

6. An optical signal transmission method, comprising:
obtaining a signal identifier of data to be transmitted;
obtaining receiver-side optical frequency slot (OFS) distribution information and sender-side OFS distribution information according to the signal identifier, comprising:
   querying for a corresponding path identifier according to the signal identifier,
   querying for a corresponding receiver-side fiber identifier and a corresponding sender-side fiber identifier according to a found path identifier, and
   obtaining the receiver-side OFS distribution information corresponding to each receiver-side fiber identifier and the sender-side OFS distribution information corresponding to each sender-side fiber identifier;
receiving, on a determined receiving carrier, an optical signal that carries the data to be transmitted, comprising:
   determining a corresponding receiving carrier according to the receiver-side OFS distribution information corresponding to each receiver-side fiber identifier, and
   receiving, on the determined receiving carrier, the optical signal that carries the data to be transmitted; and
handing the received optical signal over to a sending carrier for sending, comprising:
   determining a corresponding sending carrier according to the sender-side OFS distribution information corresponding to each sender-side fiber identifier,
   handing the received optical signal over to the determined sending carrier, and
   sending the optical signal according to a fiber indicated by each sender-side fiber identifier.

7. An optical signal transmission method, comprising:
obtaining a signal identifier of data to be received;
obtaining corresponding optical frequency slot (OFS) distribution information according to the signal identifier, comprising:
   querying for a corresponding path identifier or fiber identifier according to the signal identifier, and
   obtaining the OFS distribution information corresponding to each path identifier or each fiber identifier;
determining a corresponding receiving carrier according to the obtained OFS distribution information corresponding to each path identifier or each fiber identifier; and
receiving, on the determined receiving carrier, the optical signal that carries the data to be received.

8. An optical signal transmission method, comprising:
obtaining a signal identifier of data to be received;
obtaining corresponding optical frequency slot (OFS), distribution information according to the signal identifier, comprising:
   querying for a corresponding path identifier according to the signal identifier, and then querying for a corresponding fiber identifier according to a found path identifier, and
   obtaining the OFS distribution information corresponding to each fiber identifier;
determining a corresponding receiving carrier according to the obtained OFS distribution information corresponding to each fiber identifier; and
receiving, on the determined receiving carrier, the optical signal that carries the data to be received.

9. An optical transmitter, comprising:
a first obtaining unit configured to:
  obtain a signal identifier of data to be sent, and
  obtain a corresponding optical frequency slot (OFS) distribution information according to the signal identifier by querying for a corresponding path identifier or fiber identifier according to the obtained signal identifier, and obtaining the OFS distribution information corresponding to each path identifier or each fiber identifier;
an optical signal generating unit configured to determine a corresponding carrier according to the OFS distribution information corresponding to each path identifier or each fiber identifier and obtained by the first obtaining unit, and use the determined carrier to carry the data to be sent to generate an optical signal; and
a first optical signal sending unit configured to send, according to a path indicated by each path identifier or a fiber indicated by each fiber identifier, the corresponding optical signal generated by the optical signal generating unit.

10. An optical transmitter, comprising:
a first obtaining unit configured to:
  obtain a signal identifier of data to be sent, and
  obtain a corresponding optical frequency slot (OFS) distribution information according to the signal identifier by querying for a corresponding path identifier according to the obtained signal identifier, querying for a corresponding fiber identifier according to a found path identifier, and obtaining the OFS distribution information corresponding to each fiber identifier;
a optical signal generating unit configured to determine a corresponding carrier according to the OFS distribution information corresponding to each fiber identifier and obtained by the first obtaining unit, and use the determined carrier to carry the data to be sent to generate an optical signal; and
a first optical signal sending unit configured to send, according to a fiber indicated by each fiber identifier, the corresponding optical signal generated by the optical signal generating unit.

11. An optical add/drop multiplexer, comprising:
an obtaining unit configured to obtain a signal identifier of data to be transmitted, query for a corresponding path identifier according to the obtained signal identifier, and obtain receiver-side optical frequency slot (OFS) distribution information and sender-side OFS distribution information that are corresponding to each path on a receiver side;
a first optical signal receiving unit configured to determine a corresponding receiving carrier according to the receiver-side OFS distribution information corresponding to each path identifier and obtained by the obtaining unit, and receive, on the determined receiving carrier, an optical signal that carries the data to be transmitted;
an optical signal handover unit configured to determine a corresponding sending carrier according to the corresponding sender-side OFS distribution information under each path and obtained by the obtaining unit, and hand the optical signal received by the first optical signal receiving unit over to the determined sending carrier; and
an optical signal sending unit configured to send, according to a path indicated by each path identifier obtained by the obtaining unit, the corresponding optical signal handed over by the optical signal handover unit to the sending carrier.

12. An optical add/drop multiplexer, comprising:
an obtaining unit configured to obtain a signal identifier of data to be transmitted, query for a corresponding receiver-side fiber identifier and a corresponding sender-side fiber identifier according to the obtained signal identifier, and obtain receiver-side optical frequency slot (OFS) distribution information corresponding to the receiver-side fiber identifier and sender-side OFS distribution information corresponding to the sender-side fiber identifier;
a first optical signal receiving unit configured to determine a corresponding receiving carrier according to the receiver-side OFS distribution information corresponding to each receiver-side fiber identifier and obtained by the obtaining unit, and receive, on the determined receiving carrier, an optical signal that carries the data to be transmitted;
an optical signal handover unit configured to determine a corresponding sending carrier according to the sender-side OFS distribution information corresponding to each sender-side fiber identifier and obtained by the obtaining unit, and hand the optical signal received by the first optical signal receiving unit over to the determined sending carrier; and
an optical signal sending unit configured to send, according to a fiber indicated by each sender-side fiber identifier obtained by the obtaining unit, the corresponding optical signal handed over by the optical signal handover unit to the sending carrier.

13. An optical add/drop multiplexer, comprising:
an obtaining unit configured to obtain a signal identifier of data to be transmitted, query for a corresponding path identifier according to the obtained signal identifier, query for a corresponding receiver-side fiber identifier and a corresponding sender-side fiber identifier according to a found path identifier, and obtain receiver-side optical frequency slot (OFS) distribution information corresponding to each receiver-side fiber identifier and sender-side OFS distribution information corresponding to each sender-side fiber identifier;
a first optical signal receiving unit configured to determine a corresponding receiving carrier according to the receiver-side OFS distribution information corresponding to each receiver-side fiber identifier and obtained by the obtaining unit, and receive, on the deter mined receiving carrier, an optical signal that carries the data to be transmitted;
an optical signal handover unit configured to determine a corresponding sending carrier according to the sender-side OFS distribution information corresponding to each sender-side fiber identifier and obtained by the obtaining unit, and hand the optical signal received by the first optical signal receiving unit over to the determined sending carrier; and
an optical signal sending unit configured to send, according to a fiber indicated by each sender-side fiber identifier obtained by the obtaining unit, the corresponding optical signal handed over by the optical signal handover unit to the sending carrier.

14. An optical receiver, comprising:
an obtaining unit configured to obtain a signal identifier of data to be received, query for a corresponding path identifier or fiber identifier according to the obtained signal identifier, and obtain optical frequency slot (OFS), distribution information corresponding to each path identifier or each fiber identifier; and an optical signal receiving unit configured to determine a corresponding receiving carrier according to the OFS distribution information corresponding to each path identifier or each fiber identifier and obtained by the obtaining unit, and receive, on the determined receiving carrier, the optical signal that carries the data to be received.

15. An optical receiver, comprising:

an obtaining unit configured to obtain a signal identifier of data to be received, query for a corresponding path identifier according to the obtained signal identifier, and then query for a corresponding fiber identifier according to a found path identifier, and obtain optical frequency slot (OFS) distribution information corresponding to each fiber identifier; and an optical signal receiving unit configured to determine a corresponding receiving carrier according to the OFS distribution information corresponding to each path identifier or each fiber identifier and obtained by the obtaining unit, and receive, on the determined receiving carrier, the optical signal that carries the data to be received.

* * * * *